(12) United States Patent
Chang

(10) Patent No.: US 8,660,420 B2
(45) Date of Patent: Feb. 25, 2014

(54) ADJUSTABLE DUAL LENS CAMERA

(75) Inventor: Jen-Tsorng Chang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 11 days.

(21) Appl. No.: 13/597,604

(22) Filed: Aug. 29, 2012

(65) Prior Publication Data

US 2013/0148950 A1 Jun. 13, 2013

(30) Foreign Application Priority Data

Dec. 13, 2011 (TW) .................................. 100145939

(51) Int. Cl.
*G03B 35/00* (2006.01)
(52) U.S. Cl.
USPC ............................................ 396/326; 396/47
(58) Field of Classification Search
USPC .................... 396/324–326, 329, 428, 542; 348/47–48
See application file for complete search history.

(56) References Cited

U.S. PATENT DOCUMENTS

| | | | | |
|---|---|---|---|---|
| 2,795,173 A * | 6/1957 | Bates | ............................ | 396/326 |
| 7,298,969 B2 * | 11/2007 | Elberbaum | .................... | 396/428 |
| 7,961,234 B2 * | 6/2011 | Viinikanoja et al. | .......... | 396/325 |
| 8,189,100 B2 * | 5/2012 | Li et al. | ........................... | 348/47 |
| 2008/0117290 A1 * | 5/2008 | Mazza | ........................ | 348/47 |
| 2009/0309987 A1 * | 12/2009 | Kimura et al. | ............. | 348/218.1 |
| 2011/0128393 A1 * | 6/2011 | Tavi et al. | .................. | 348/218.1 |
| 2011/0157387 A1 * | 6/2011 | Han et al. | ................... | 348/218.1 |

* cited by examiner

*Primary Examiner* — Christopher Mahoney
(74) *Attorney, Agent, or Firm* — Altis Law Group, Inc.

(57) ABSTRACT

A dual lens camera includes a main circuit board, two lens modules positioned on the main circuit board, a controller positioned on the main circuit board, a position sensors positioned on each lens module, two tilting mechanisms positioned on the main circuit board, and each tilting mechanism being connected to a corresponding one of the lens modules, and two flexible circuit boards connecting the position sensors to the main circuit board. The controller controls the tilting mechanisms to tilt the lens modules to a position detectable by the position sensors.

18 Claims, 4 Drawing Sheets

ADJUSTABLE DUAL LENS CAMERA

BACKGROUND

1. Technical Field

The present disclosure generally relates to dual lens cameras, and particularly, to a dual lens camera having tilting mechanisms.

2. Description of the Related Art

Referring to FIG. 4, a dual lens camera 20 includes a circuit board 21 and two fixed-focus lens modules 23 positioned on the circuit board 21. Because a visual angle θ of each fixed-focus lens module 23 is fixed, and a distance between the fixed-focus lens modules 23 is constant, a range of the depth of field of the dual lens camera 20 is fixed, and a minimum depth of field D of the dual lens camera 20 is relatively high. Therefore, the dual lens camera 20 is not adapted to capture images of a scene which is very near.

In order to make the depth of field of the dual lens camera 20 adjustable, the dual lens camera 20 may use zoom lens modules. However, the zoom lens modules generally have a plurality of lenses, and the distances between each of the plurality of lenses needs to be adjusted all the time. Therefore, a manufacturing cost of the dual lens camera 20 increases, and the image quality of the dual lens camera 20 is relatively low.

Therefore, there is room for improvement within the art.

BRIEF DESCRIPTION OF THE DRAWING

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
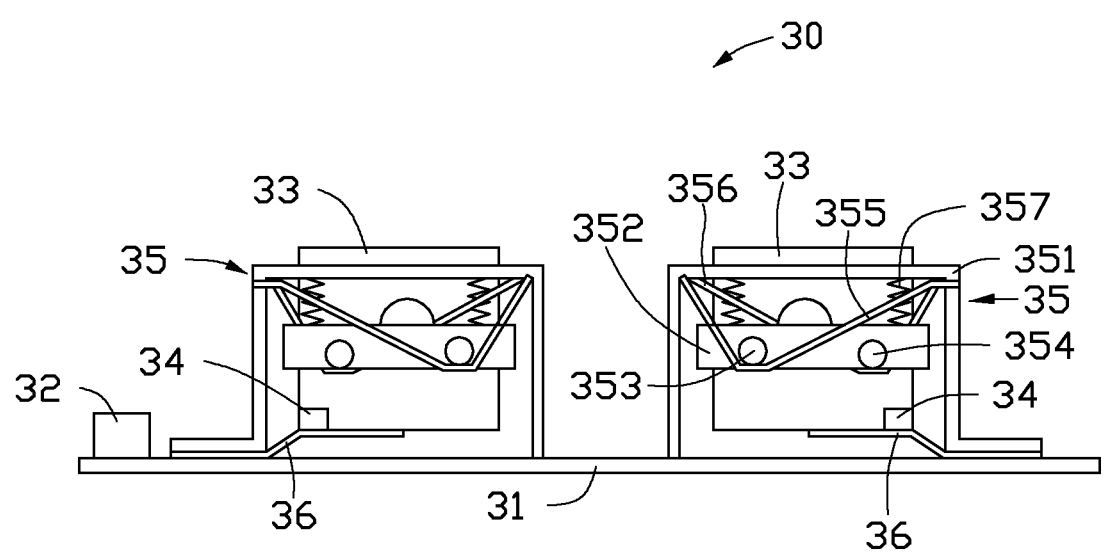
FIG. 1 is a schematic view of a first embodiment of a dual lens camera.

Referring to FIG. 1, a first embodiment of a dual lens camera 30 includes a main circuit board 31, a controller 32 positioned on the main circuit board 31, two lens modules 33 positioned on the main circuit board 31, a position sensor 34 positioned on each of the lens modules 33, two tilting mechanisms 35 positioned on the main circuit board 31 and respectively connected to the lens modules 33, and two flexible circuit boards 36 connecting the position sensors 34 to the main circuit board 31. In the illustrated embodiment, the position sensors 34 are Hall sensors.

The tilting mechanisms 35 are positioned on opposite ends of the main circuit board 31. Each tilting mechanism 35 includes a support frame 351 positioned on the main circuit board 31, a positioning plate 352 connected to the lens module 33, a first roller 353 and a second roller 354 rotatably positioned on the positioning plate 352, a first adjusting line 355 surrounding the first roller 353, a second adjusting line 356 surrounding the second roller 354, and two elastic members 357 connecting the support frame 351 to the positioning plate 352. Ends of the first adjusting line 355 are respectively fixed to opposite sides of the support frame 351. Ends of the second adjusting line 356 are respectively fixed to opposite sides of the support frame 351. In the illustrated embodiment, the first adjusting line 355 and the second adjusting line 356 are made of shape memory alloy (SMA). Therefore, when the first adjusting line 355 and the second adjusting line 356 are heated, respective lengths of the first adjusting line 355 and the second adjusting line 356 increase, and the respective lengths of the first adjusting line 355 and the second adjusting line 356 revert and decrease to the original length upon cooling. The shape memory alloy can be one of nickel-titanium alloy, silver cadmium alloy, copper and zinc alloy, and copper-tin alloy. The elastic members 357 are positioned on opposite sides of the positioning plate 352, and each of the elastic members 357 can be compressed to store an elastic force. In the illustrated embodiment, the elastic members 357 are compression springs.

Figure 2:
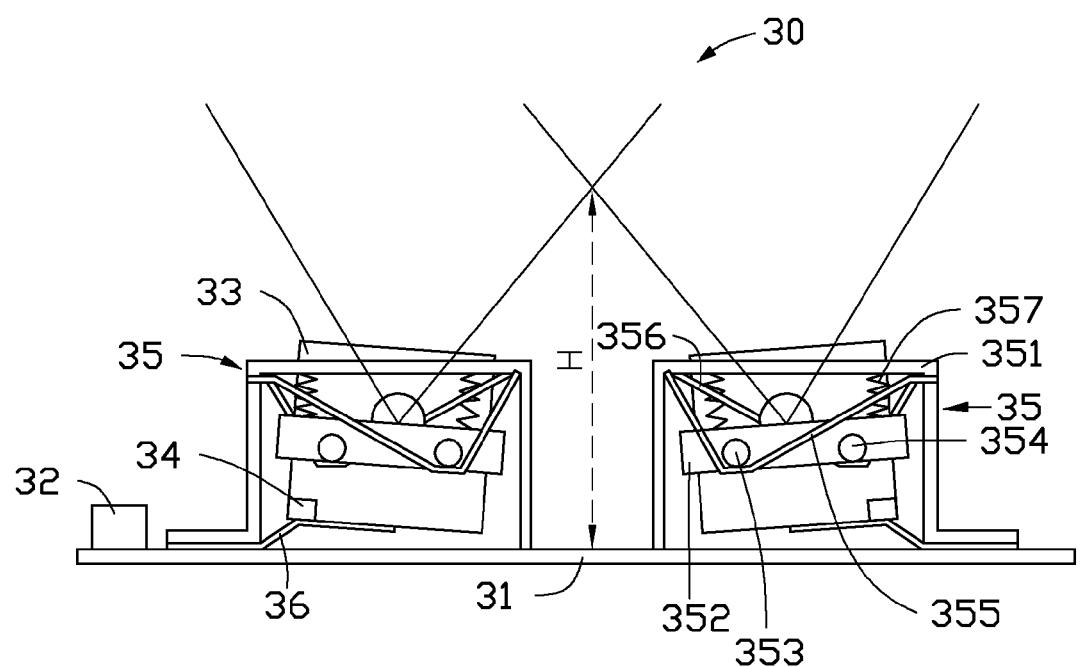
FIG. 2 is a schematic view of the dual lens camera of FIG. 1, a depth of field of the dual lens camera having been adjusted.

Referring to FIG. 2, when a depth of field of the dual lens camera 30 is beyond a very near scene, the controller 32 controls a heating member (not shown) to heat and thus soften the first adjusting line 355. The length of each first adjusting line 355 increases due to the elastic force stored in the elastic member 357 adjacent to the first roller 353. Because the length of the first adjusting line 355 increases, and the length of the second adjusting line 356 does not, each lens module 33 is tilted relative to the support frame 351, and thus the depth of field of the dual lens camera 30 changes. Because the two lens modules 33 are tilted towards a side of the support frame 351 adjacent to the first rollers 353, the minimum depth of field H of the dual lens camera 30 is decreased, and thus the dual lens camera 30 can capture a scene very close to the dual lens camera 30. During tilting of the lens module 33, each position sensor 34 detects a real-time position of the lens module 33, and transmits a signal including the real-time position to the controller 32 through the flexible circuit board 36 and the main circuit board 31. When the lens modules 33 are tilted to a predetermined angle, the controller 32 controls the heating member to stop increasing the heating of the first adjusting lines 355, and controls the lens modules 33 to capture an image. After capturing the image, the first adjusting lines 355 are allowed to cool, and thus the first adjusting line 355 reverts to its original length, that is, the lens modules 33 come back to the original position.

In an alternative embodiment, the first adjusting line 355 and the second adjusting line 356 may be made of pure metal, such as copper. In that case, the elastic members 357 can be omitted. One end of the first adjusting line 355 is fixed to the support frame 351, and the other end of the first adjusting line 355 is connected to a first rotating wheel (not shown). One end of the second adjusting line 356 is fixed to the support frame 351, and the other end of the second adjusting line 356 is connected to a second rotating wheel (not shown). The controller 32 controls the first rotating wheel and the second rotating wheel to respectively change the lengths of the first adjusting line 355 and the second adjusting line 356 by rotating, and thus the depth of field of the dual lens camera 30 is changed.

Figure 3:
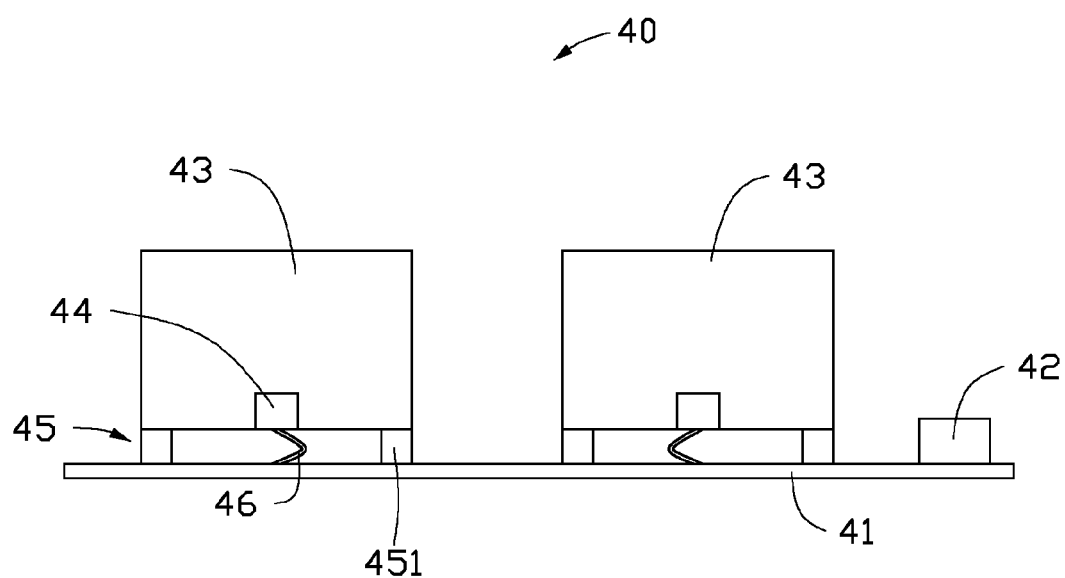
FIG. 3 is a schematic view of a second embodiment of a dual lens camera.
Figure 4:
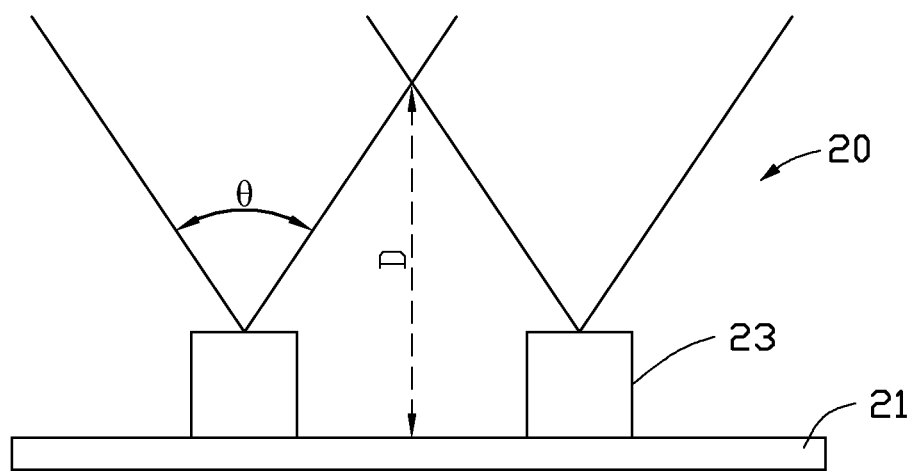
FIG. 4 is a schematic view of a dual lens camera of related art.

Referring to FIG. 3, a second embodiment of a dual lens camera 40 includes a main circuit board 41, a controller 42 positioned on the main circuit board 41, two lens modules 43 positioned on the main circuit board 41, a position sensor 44 positioned on each of the lens modules 43, two tilting mechanisms 45 positioned on the main circuit board 41 and respectively connected to the lens modules 43, and two flexible circuit boards 46 connecting the position sensors 44 to the main circuit board 41.

Each tilting mechanism 45 includes four driving members 451 positioned between the lens modules 43 and the main circuit board 41. A pair of driving members 451 is positioned under one lens module 43. In the illustrated embodiment, the driving members 451 are piezoelectric motors. In an alternative embodiment, each tilting mechanism 45 may includes more than four driving members 451.

To adjust a depth of field of the dual lens camera 40, the driving members 451 are controlled by the controller 42 to lengthen or shorten, and thereby adjust a tilting angle of the lens modules 43. During tilting of the lens module 43, each position sensor 44 detects a real-time position of a lens module 43, and transmits a signal including the real-time position to the controller 42 through the flexible circuit board 46 and the main circuit board 41. When the lens modules 43 are tilted to a predetermined angle, the controller 42 controls the driving members 451 to stop lengthening or shortening, and then the lens modules 43 can capture an image of a very near scene. After capturing, the controller 42 controls the driving members 451 to move to make the lens modules 43 come back to the original position.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. A dual lens camera, comprising:
a main circuit board;
two lens modules positioned on the main circuit board;
a controller positioned on the main circuit board;
two position sensors positioned on the lens modules;
two tilting mechanisms positioned on the main circuit board, and each tilting mechanism connecting to a corresponding one of the lens modules; and
two flexible circuit boards connecting the position sensors to the main circuit board;
wherein the controller controls the tilting mechanisms to tilt the lens modules, according to a position of the lens modules detected by the position sensors.

2. The dual lens camera of claim 1, wherein each of the two tilting mechanisms comprises a support frame positioned on the main circuit board, a positioning plate connected to the lens module, a first roller and a second roller rotatably positioned on the positioning plate, a first adjusting line surrounding the first roller, a second adjusting line surrounding the second roller, and two elastic members connecting the support frame to the positioning plate.

3. The dual lens camera of claim 2, wherein the first adjusting line and the second adjusting line are made of shape memory alloy.

4. The dual lens camera of claim 3, wherein shape memory alloy is one of nickel-titanium alloy, silver cadmium alloy, copper and zinc alloy, and copper-tin alloy.

5. The dual lens camera of claim 2, wherein the two elastic members are positioned on opposite sides of the positioning plate.

6. The dual lens camera of claim 1, wherein each of the two tilting mechanisms comprises a plurality of driving members positioned between the lens modules and the main circuit board.

7. The dual lens camera of claim 6, wherein each of the two tilting mechanisms comprises four driving members, and each two driving members positioned under one lens module.

8. The dual lens camera of claim 6, wherein the driving members are piezoelectric motors.

9. The dual lens camera of claim 1, wherein the position sensors are Hall sensors.

10. The dual lens camera of claim 1, wherein the position sensors are Hall sensors.

11. A dual lens camera, comprising:
a main circuit board;
two lens modules positioned on the main circuit board;
a controller positioned on the main circuit board;
two position sensors positioned on the lens modules and electrically connected to the controller; and
two tilting mechanisms positioned on the main circuit board, and each tilting mechanism connecting to a corresponding one of the lens modules;
wherein the controller controls the tilting mechanisms to tilt the lens modules, according to a position of the lens modules detected by the position sensors.

12. The dual lens camera of claim 11, wherein each of the two tilting mechanisms comprises a support frame positioned on the main circuit board, a positioning plate connected to the lens module, a first roller and a second roller rotatably positioned on the positioning plate, a first adjusting line surrounding the first roller, a second adjusting line surrounding the second roller, and two elastic members connecting the support frame to the positioning plate.

13. The dual lens camera of claim 12, wherein the first adjusting line and the second adjusting line are made of shape memory alloy.

14. The dual lens camera of claim 13, wherein shape memory alloy is one of nickel-titanium alloy, silver cadmium alloy, copper and zinc alloy, and copper-tin alloy.

15. The dual lens camera of claim 12, wherein the two elastic members are positioned on opposite sides of the positioning plate.

16. The dual lens camera of claim 11, wherein each of the two tilting mechanisms comprises a plurality of driving members positioned between the lens modules and the main circuit board.

17. The dual lens camera of claim 16, wherein each of the two tilting mechanisms comprises four driving members, and each two driving members positioned under one lens module.

18. The dual lens camera of claim 16, wherein the driving members are piezoelectric motors.

* * * * *